(12) United States Patent
Cohen

(10) Patent No.: US 12,195,069 B2
(45) Date of Patent: Jan. 14, 2025

(54) MULTI-PIECE SLED

(71) Applicant: Snow Joe, LLC, Hoboken, NJ (US)

(72) Inventor: Joseph Cohen, Hoboken, NJ (US)

(73) Assignee: Snow Jose, LLC, Hoboken, NJ (US)

( * ) Notice: Subject to any disclaimer, the term of this patent is extended or adjusted under 35 U.S.C. 154(b) by 110 days.

(21) Appl. No.: 18/125,984

(22) Filed: Mar. 24, 2023

(65) Prior Publication Data

US 2023/0311970 A1    Oct. 5, 2023

Related U.S. Application Data

(60) Provisional application No. 63/324,927, filed on Mar. 29, 2022.

(51) Int. Cl.
*B62B 15/00* (2020.01)
*B62B 17/06* (2006.01)
*B62B 17/08* (2006.01)

(52) U.S. Cl.
CPC ............ *B62B 15/00* (2013.01); *B62B 17/061* (2013.01); *B62B 17/08* (2013.01); *B62B 2205/006* (2013.01)

(58) Field of Classification Search
CPC ....... B62B 17/00; B62B 17/061; B62B 17/08; B62B 15/00; B62B 2205/00; B62B 2205/006
See application file for complete search history.

(56) References Cited

U.S. PATENT DOCUMENTS

| | | | | |
|---|---|---|---|---|
| 3,799,566 A | * | 3/1974 | Thompson | B62B 15/00 280/18 |
| 3,884,490 A | * | 5/1975 | Hellman | B62B 13/16 280/18 |
| 4,262,919 A | * | 4/1981 | Krent | B62B 15/00 280/22 |
| 4,573,695 A | * | 3/1986 | Kennel | B62B 13/16 280/8 |
| 6,017,043 A | * | 1/2000 | Bennett | B62B 15/00 280/18 |
| 6,349,950 B1 | * | 2/2002 | Levy | B62B 13/125 280/22 |
| 2005/0212230 A1 | * | 9/2005 | Krent | B62B 13/08 280/15 |

* cited by examiner

Primary Examiner — Brian L Swenson
(74) Attorney, Agent, or Firm — Seyfarth Shaw LLP; Brian Michaelis

(57) ABSTRACT

A multi-piece snow sled designed to be transported in a compact form then assembled into a full-sized sled, and more specifically a multi-piece snow sled designed to be transported in a compact form then assembled into a full-sized sled having a rigid floor. The multi-piece sled comprises a front sled body piece, a rear sled body piece, a front interface edge, a rear interface edge, and a plurality of removable fasteners securing the front interface edge to the rear interface edge.

20 Claims, 4 Drawing Sheets

MULTI-PIECE SLED

FIELD OF THE DISCLOSURE

The current disclosure relates to snow sleds.

BACKGROUND

Sleds used for snow sledding must be large enough to accommodate a rider. Therefore, sleds can become large and bulky. Some sleds that accommodate two or more riders are even larger. As with all sleds, the riders have to transport the sled to the location where it is used. If the location is within walking distance, the rider can drag the sled. However, if the rider would like to carry a sled, it can be cumbersome due to its large size.

If the location where the sled is to be ridden is not within walking distance, the riders may be driven to the location. If there are several riders, then several sleds also have to be driven to the sledding location and there may not be enough room for all of the sleds and riders. The large size of the sleds becomes a problem.

There have been attempts to design sleds that have reduced size. There have been several folding designs. For example, a first folding design may include a front plastic section and a rear plastic section connected by a thinned portion between the front and rear plastic sections, which acts as a hinge. There are numerous problems with this design. The plastic hinge is thin and exposed to cold conditions. Due to the constant folding and flexing during use, the plastic in the hinge gets fatigued. The fatigue causes cracks and later tears or causes breakage in the hinge. Further problems resulted from the considerable height resulting from the rear portion folding onto the front portion.

A folding bobsled design is also known with a front section and rear section hinged on a vertical axis, which allows the first section to be turned to steer the sled. Another hinge, having a horizontal axis, allows the second section to be folded onto the first section, except both sections include runner blades extending downward from the flat sled surface when in the unfolded (use) position. When folded, one runner extends downward with the runners of the second portion flipped over and resting upon the first portion, extending upward. The length of the bobsled may have been shortened, however its height is at least twice the runner height plus the thickness of the flat sled surfaces. Such folding sleds are cumbersome, hefty, and are not light or easy to transport.

SUMMARY

The current disclosure relates to a snow sled designed to be transported in a compact form then assembled into a full-sized sled having a rigid floor. According to one aspect of the disclosure, a multi-piece sled may include a front sled body piece, a rear sled body piece, a front interface edge, a rear interface edge, and a plurality of removable fasteners securing the front interface edge to the rear interface edge.

A sled according to the disclosure comprises a first body defining a first profile and further comprising a first floor and first, second, and third sidewalls; a first connector interface coupled to the first floor opposite the third sidewall. The sled includes a second body defining a second profile and further comprising a second floor, and fourth, fifth, and sixth sidewalls; a second connector interface coupled to the second floor opposite the sixth sidewall, the second connector interface adapted to engage the first connector interface. The first profile substantially matches the second profile when the second body is rotated and disposed on the first body such that sixth sidewall is adjacent to the third sidewall.

The sled may include the first connector interface comprising a plurality of protrusions; and the second connector interface comprising a plurality of tabs adapted to engage the plurality of protrusions of the first connector interface. In the sled according to the disclosure, each of the plurality of protrusions may define an upper extension and a lower extension, the upper and lower extensions defining a respective slot therebetween; and each of the plurality of tabs engaging the respective slot between the upper and lower extensions.

Each of the plurality of protrusions may define a first hole and each of the plurality of tabs defines a second hole; wherein a fastener is disposed through the first and second holes to couple the first body to the second body.

The first and second sidewalls each define a sidewall hole and the fourth and fifth sidewalls each define a socket, wherein sidewall fasteners are disposed through the sidewall holes and sockets to couple the first sidewall to the fourth sidewall and the second sidewall to the fifth sidewall.

The sled may further comprise a first handle coupled to the fourth sidewall and a second handle coupled to the fifth sidewall. The fourth and fifth sidewalls may each define handle holes, the first and second handles pivotably coupled to the fourth and fifth sidewalls, respectively, through the handle holes.

The first and second handles may further comprise a break disposed at a distal end of each handle, wherein the break is adapted to engage a sledding surface when the handle is raised.

The above summary has outlined, rather broadly, some features and advantages of the present disclosure in order that the detailed description that follows may be better understood. Additional features and advantages of the disclosure will be described below. It should be appreciated by those skilled in the art that this disclosure may be readily utilized as a basis for modifying or designing other structures/processes/steps for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization, method of operation, or resultant product, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details.

Figure 1:
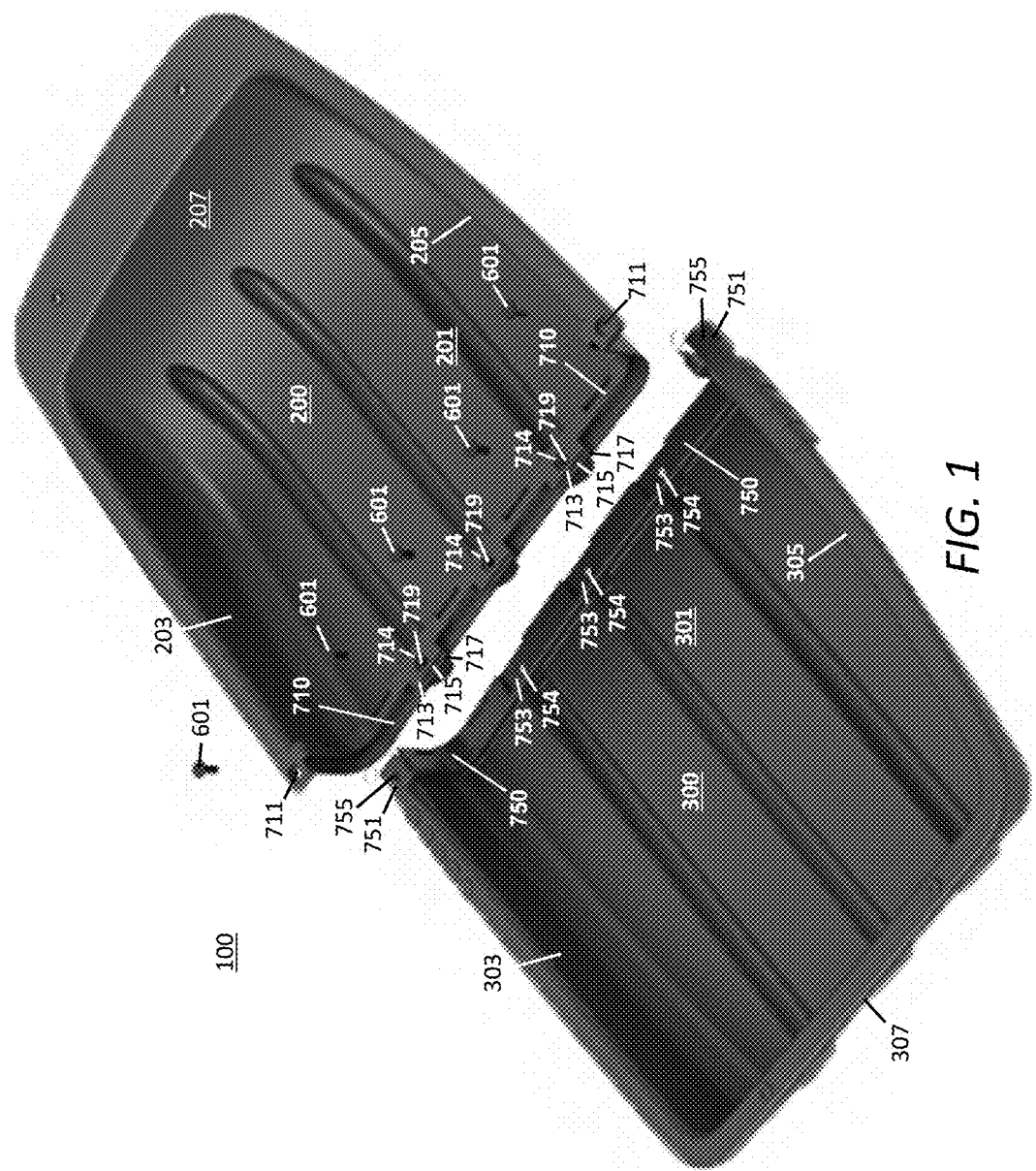
FIG. 1 illustrates a front sled body piece and a rear sled body piece in a disassembled state according to one aspect of the disclosure.
Figure 2:
FIG. 2 illustrates a front sled body piece and a rear sled body piece in an assembled state according to one aspect of the disclosure.

Referring generally to FIGS. 1 and 2, a multi-piece sled 100 is disclosed having a front sled body piece 200 that is designed to be attached to a rear sled body piece 300 at an interface 700 to form the full body of sled 100. According to one aspect the front and rear sled pieces may include, be molded from, or formed from a polymeric material, such as polyethylene, PVC, nylon, or the like.

The front sled body piece 200 may include a front piece floor 201 with front, rear, left, and right sides. A front angled wall 207 and sidewalls 203, 205 may extend upward from the front, left and right sides of the front piece floor 201, respectively. The left sidewall 203 and the right sidewall 205 may angle outward slightly as they extend upward away from the front piece floor 201. In this illustrative embodiment, the front angled wall 207 may extend further outward than do the sidewalls 203, 205. The front of the sidewalls 203, 205 may connect with the sides of the front angled wall 207 forming a tub-like structure of the front sled body piece, without a rear wall.

Similarly, the rear sled body piece 300 has a rear piece floor 301 having a front, rear, left side, and right side. A rear wall 307 and sidewalls 303, 305 extend upward from the rear, left and right sides of the rear floor, respectively. The rear wall 307, the left sidewall 303, and right sidewall 305 angle outward slightly as they extend upward away from the rear piece floor 301. The rear end of the sidewalls 303, 305 may connect with the ends of the rear wall 307 creating a tub-like structure of the rear sled body piece 300 without a front wall.

The sidewalls 203, 205, 303, 305 of both the front and rear sled body pieces 200, 300 may angle slightly outward as they extend upward from the front piece floor 201 and the rear piece floor 301, respectively. This structure allows the body pieces to be stackable (e.g., one piece fits within the other so the pieces are very compact).

If the rear sled body piece 300 is rotated 180 degrees such that the rear wall 307 is forward, and placed on top of the front sled body piece 200, the rear body piece 300 may fit within the inside profile of the front sled body piece 200, forming a compact structure approximately half the length of the assembled sled.

When the sled body pieces 200, 300 are stacked in this manner, their total height may be approximately the height of the highest sidewall plus the thickness of the bottom of the front body piece 200 and that of the rear body piece 300. This design allows the multi-piece sled 100 to be stacked into a shipping container, e.g., a relatively shallow box, and shipped as two parts in a smaller package. According to one aspect, the stacking configuration allows for a disassembled, compact design which allows the sled 100 to be carried relatively easily and in a smaller container.

The rear edge of the front sled body piece 200 may include a front interface connector at edge 710. The front interface connector edge 710 includes a plurality of upper securing protrusions 713 extending rearward each having a hole 719 defined through the protrusion 713, above a plurality of lower securing extensions 717 creating a slot 715 between them.

The rear sled body piece 300 has a rear interface connector edge 750 adjacent to the rear piece floor 301. The rear interface connector edge 750 includes several flattened securing sections 753, each positioned and sized to engage the slots 715 between the upper securing extension 713 and the lower securing extension 717 of the front interface connector edge 710.

Fasteners 601, which may include pins, dowels, screws, anchors, or the like, may fit through holes 714 in the upper securing section 713, then through fastener sockets 719 in the lower securing section 717 and into, holes 754 in the flattened securing sections 753 securing the front piece floor 201 to the rear piece floor 301 at the interface 700.

Sidewall extensions 203, 205 may further define sidewall holes 711 for receiving a fastener 601 into fastener sockets 755 of sidewall pads 751 on sidewalls 303, 305, thereby securing the upper portions of the sidewalls 203, 303 and 205, 305 together. This assembly results in the fully assembled sled 100.

According to one aspect, the fasteners 601 may be removable, allowing a rider to disassemble the sled 100 to carry it in a backpack or a car trunk, and reassemble it at the location where the sled 100 is to be used. It may then be unassembled for transport again.

According to an alternative aspect of the present disclosure, the fasteners 601 may be non-removable, and retained in the securing section of one of the front sled body piece 200 or rear sled body piece 300. In this case, the body pieces 200, 300 may be shipped or transported in a compact and stacked arrangement. Once at the location, the sled body pieces 200, 300 may be assembled into the full sled. It will then remain in this assembled form. Such a design may be suited for selling and shipping the sled 100 at low cost for eCommerce sales.

Figure 3:
FIG. 3 illustrates an alternative embodiment of a multi-piece sled having a front sled body piece and a rear sled body piece in a disassembled state, according to one aspect of the disclosure, with sled handles/brakes.
Figure 4:
FIG. 4 illustrates an alternative embodiment of a multi-piece sled having a front sled body piece and a rear sled body piece in an assembled state, according to one aspect of the disclosure, with sled handles/brakes.

According to another aspect of the present disclosure, illustrated in FIGS. 3 and 4, a multi-piece sled according to the disclosure may be implemented having handles 900 and/or brakes 902. The handles 900 and brakes 902, may be formed from an elongated member having a proximal end (handle) and a distal end (brake), and disposed on the right and/or left sides of the front or rear sled body pieces. According to one aspect, the handles 900/brakes 902 may be implemented on both sides, left and right, in the rear sled body piece. According to one aspect, the sidewalls of the rear body piece include or define a handle hole 903 through which the handle 900/brake 902 may pass. The handle 900/brake 902 may be attached via a pivotable coupling 905, 905' to the sidewall at or near the handle hole 903. Accordingly, a user may grip the handle 900 and pull upward, pivoting the brake 902 downward and into the snow surface, creating a drag force slowing or steering the sled. It should be appreciated that a single handle 900/brake 902 could be implemented, e.g., on only one of the left or right side, or as illustrated dual brakes 902 may be implemented according to the disclosure. According to one aspect, the handles 900/brakes 902 could be implemented separately as just a handle, or as just a brake. The handle 900/brake 902 may function as at least one of a handle 900 for grasping by a user or a brake 902 for a user to slow the sled or affect direction of travel.

While aspects of the present disclosure describe a sled body in two pieces, one skilled in the art will recognize that the sled body may comprise additional body pieces beyond the front sled body piece 200 and the rear sled body piece 300. Further, alternative interfaces may be implemented with alternative fasteners, a snap fit, or the like, for permanent or semi-permanent assembly, or for ready disassembly.

Aspects of the present disclosure are described herein with reference to the accompanying drawings. However, the present disclosure should not be construed as limited to the aspects set forth herein. Rather, these aspects are provided so that this disclosure will be thorough and complete, and will fully convey the scope of the present disclosure to those skilled in the art.

Although illustrative aspects of the present disclosure have been described herein with reference to the accompanying drawings, it is to be understood that the present disclosure is not limited to those precise aspects, and that various other changes and modifications may be made by one skilled in the art without departing from the scope or spirit of the disclosure.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

As used herein, the singular forms "a," "an," and "the" are intended to include the plural forms as well, unless the context clearly indicates otherwise. It should be appreciated that in the appended claims, reference to an element in the singular is not intended to mean "one and only one" unless explicitly so stated, but rather "one or more." It will be further understood that the terms "comprises," "comprising," "having," "includes," "including," and/or variations thereof, when used herein, specify the presence of stated features, steps, operations, elements, and/or components, but do not preclude the presence or addition of one or more other features, steps, operations, elements, components, and/or groups thereof. In the above description, it is understood that terms such as "first," "second," "third," "above," "below," "front," "rear," "left," "right," and the like, are words of convenience and are not to be construed as limiting terms unless expressly stated otherwise.

It should be understood that when an element is referred to as being "connected" or "coupled" to another element (or variations thereof), it can be directly connected or coupled to the other element or intervening elements may be present. In contrast, when an element is referred to as being "directly connected" or "directly coupled" to another element (or variations thereof), there are no intervening elements present.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," "substantially," or the like, when accompanying a numerical value or direction are to be construed as indicating a deviation as would be appreciated by one of ordinary skill in the art to operate satisfactorily for an intended purpose. Ranges of values and/or numeric values are provided herein as examples only, and do not constitute a limitation on the scope of the described aspects. The use of any and all examples, or exemplary language ("e.g.," "such as," or the like) provided herein, is intended merely to better illuminate the aspects and does not pose a limitation on the scope of the aspects. No language in the specification should be construed as indicating any unclaimed element as essential to the practice of the aspects.

Benefits, other advantages, and solutions to problems have been described herein with regard to specific aspects. However, the benefits, advantages, solutions to problems, and elements that may cause any benefit, advantage, or solution to occur or become more pronounced are not to be construed as critical, required, or essential features or elements of the disclosure.

What is claimed is:

1. A multi-piece sled comprising:
    a first sled body piece comprising:
        a first piece floor having a left side, a front side, a right side, and a rear side;
        a first sidewall connected to and extending upward from the left side of the front piece floor;
        a first angled wall connected to and extending upward from the front side of the first piece floor;
        a second sidewall connected to and extending upward from the right side of the first piece floor;
        wherein front sections of the first and second sidewalls are connected to left and right sides of the first angled wall;
    a second sled body piece comprising:
        a second piece floor having a left side, a front side, a right side, and a rear side;
        a third sidewall connected to and extending upward from the left side of the second piece floor;
        a rear wall connected to and extending upward from the front side of the rear piece floor;
        a fourth sidewall connected to and extending upward from the right side of the rear piece floor;
    a front interface edge on the rear side of the first piece floor, comprising:
        a plurality of upper securing extensions each positioned at a plurality of locations along the front interface edge;
        a plurality of lower securing extensions each positioned below the plurality of upper securing extensions thereby forming a slot between each of the upper securing extensions and the lower securing extensions;
    a rear interface edge at the front side of the rear piece floor comprising:
        a plurality of flattened securing sections, each flattened securing section positioned to engage a corresponding slot;
    a plurality of fasteners securing the upper securing extension and the lower securing extensions to the flattened securing sections.

2. The multi-piece sled of claim 1, wherein:
    each upper securing extension further defines a first hole;
    each flattened securing section further defines a second hole aligned with the first hole when the front interface edge is engaged with the rear interface edge.

3. The multi-piece sled of claim 1 wherein the first and second sidewalls define sidewall holes and the third and fourth sidewalls define sockets aligned with the sidewall holes, the sidewall holes and the sockets adapted to receive and secure a sidewall fastener.

4. The multi-piece sled of claim 3, further comprising:
a sidewall pad positioned at each socket of the second sled body piece;
wherein the sidewall fastener extends through the sidewall pads, thereby, making the first and third and second and fourth sidewalls continuous, respectively.

5. The multi-piece sled of claim 1, wherein the fasteners are removable.

6. The multi-piece sled of claim 1, wherein the sidewalls, front wall, and rear wall extend outwardly at an angle, such that the first sled body piece and second sled body piece define a substantially similar profile when the second sled body piece is rotated 180 degrees and disposed on the first sled body piece.

7. The multi-piece sled of claim 1, wherein the first piece floor extends past the rear interface edge to overlap the second piece floor providing a continuous bottom surface.

8. The multi-piece sled of claim 1, further including at least one handle coupled to the first or second sidewall.

9. The multi-piece sled of claim 8 wherein the first sidewall defines a handle hole, the handle extending from above the first sidewall through the handle hole.

10. The multi-piece sled of claim 9 wherein the handle is pivotably coupled to the sidewall through the handle hole.

11. The multi-piece sled of claim 10 wherein the handle includes a proximal and a distal end, the proximal end forming a handle disposed above the first sidewall and the distal end forming a brake disposed outside of the first sidewall.

12. A sled comprising:
a first body defining a first profile and further comprising:
a first floor and first, second, and third sidewalls;
a first connector interface coupled to the first floor opposite the third sidewall;
a second body defining a second profile and further comprising:
a second floor, and fourth, fifth, and sixth sidewalls;
a second connector interface coupled to the second floor opposite the sixth sidewall, the second connector interface adapted to engage the first connector interface;
wherein the first profile substantially matches the second profile when the second body is rotated and disposed on the first body such that sixth sidewall is adjacent to the third sidewall.

13. The sled of claim 12 wherein:
the first connector interface comprises a plurality of protrusions;
the second connector interface comprising a plurality of tabs adapted to engage the plurality of protrusions of the first connector interface.

14. The sled of claim 13, wherein
each of the plurality of protrusions define an upper extension and a lower extension, the upper and lower extensions defining a respective slot therebetween;
each of the plurality of tabs engaging the respective slot between the upper and lower extensions.

15. The sled of claim 13 wherein each of the plurality of protrusions defines a first hole and each of the plurality of tabs defines a second hole; wherein a fastener is disposed through the first and second holes to couple the first body to the second body.

16. The sled of claim 12 wherein the first and second sidewalls each define a sidewall hole and the fourth and fifth sidewalls each define a socket, wherein sidewall fasteners are disposed through the sidewall holes and sockets to couple the first sidewall to the fourth sidewall and the second sidewall to the fifth sidewall.

17. The sled of claim 12 further comprising a first handle coupled to the fourth sidewall and a second handle coupled to the fifth sidewall.

18. The sled of claim 17 wherein the fourth and fifth sidewalls each define handle holes, the first and second handles pivotably coupled to the fourth and fifth sidewalls, respectively, through the handle holes.

19. The sled of claim 18 wherein the first and second handles further comprise a break disposed at a distal end of each handle, wherein the break is adapted to engage a sledding surface when the handle is raised.

20. A sled comprising:
a first body defining a first profile and further comprising:
a first floor and first, second, and third sidewalls;
a first connector interface opposite the third sidewall, the first connector interface defining a plurality of slots and fastener holes;
a second body defining a second profile and further comprising:
a second floor, and fourth, fifth, and sixth sidewalls;
a first handle hole defined in the fourth sidewall and a second handle hole defined in the fifth sidewall;
a second connector interface opposite the sixth sidewall, the second connector interface defining a plurality of tabs and a second plurality of fastener holes, the plurality of tabs adapted to engage the plurality of slots of the first connector interface;
a plurality of pins disposed through the first and second fastener holes when the plurality of tabs are engaged with the plurality of slots;
a first handle and second handle pivotably coupled to the second body through the first and second handle holes, respectively, the first and second handles including a break disposed at a distal end of each of the first and second handles;
wherein the first profile substantially matches the second profile when the second body is rotated and disposed on the first body such that sixth sidewall is adjacent to the third sidewall.

* * * * *